United States Patent Office 2,952,578
Patented Sept. 13, 1960

2,952,578

HEAT SEALING METHOD

Frank A. Carlson, Jr., Springfield, Mass., assignor to Monsanto Chemical Company, St. Louis, Mo., a corporation of Delaware No Drawing. Filed Jan. 10, 1956, Ser. No. 558,193

4 Claims. (Cl. 154—126)

The present invention relates to a heat sealing method. More particularly, the invention relates to a novel method for heat sealing thermoplastic resins to themselves and to other surfaces without the use of adhesives.

A common method for sealing thermoplastic resins to themselves or to other surfaces is to heat the thermoplastic resin to its softening temperature and to press the surfaces together under light pressure. The heat to soften the thermoplastic resin may be supplied by directly contacting the resin with a heating element or by placing the resin in a high frequency field. While such methods are widely used, it is recognized that they are subject to certain inherent limitations. The direct heating method may be employed only with thin thermoplastic films and, in addition, there is a strong tendency for the thermoplastic resin to stick to the heating element. The dielectric sealing method can be used on a practical basis with only certain thermoplastic resins. Both of these heat sealing methods are grossly inefficient in that the entire thermoplastic section is heated whereas only a very thin surface layer need be softened to provide adequate adhesion.

The heat sealing of thermoplastic resin foams gives rise to special and heretofore nearly insoluble problems. Such thermoplastic resin foams are excellent insulators and, consequently, are extremely difficult to heat through by contacting the resin with a heating element. In addition, heating thermoplastic resin foams above the resin softening point causes collapse of the foams cellular structure. Thus, to this time, there has been no satisfactory method for heat sealing thermoplastic foams to themselves or to other surfaces.

It is an object of this invention to provide an improved method for heat sealing thermoplastic resins to themselves or to other surfaces.

Another object of this invention is to provide an improved method for heat sealing thermoplastic foams to themselves or to other surfaces.

Other objects and advantages of this invention will become apparent from the following detailed description thereof.

In accordance with the present invention there is provided a novel heat sealing method in which an assembly is prepared by placing a thin metallic conductor between the thermoplastic resin and the solid surface to which it is to be joined and electrically heating the metallic conductor above the softening point of the thermoplastic resin. In this manner, heat is provided only at the locus of the seal.

The following examples are set forth to illustrate more clearly the principle and practice of this invention to those skilled in the art.

*Example I*

A 0.002 inch thick sheet of aluminum foil is placed between two blocks of 0.12 inch thick foamed polystyrene and the entire assembly is placed under light pressure. Brass terminals are attached to the ends of the aluminum foil so as to provide an electrical circuit through the foil. The aluminum foil is melted by passing the current from a 110 volt line through the foil and this heat melts a thin layer of each polystyrene foam section and forms a strong bond therebetween. When the structure is cut open, the residue of the aluminum foil is found in the form of small droplets which do not affect the strength of the seal.

*Example II*

Example I is repeated except that the aluminum foil is replaced with a section of fine mesh copper screen. A rheostat is placed in the circuit so that the amperage flowing through the copper screen is sufficient to heat it above the softening temperature of the polystyrene foam, but insufficient to melt the screen. A strong bond is obtained between the two sections of polystyrene foam.

*Example III*

A 0.05 inch thick film of polyethylene is placed on a wooden block and a 0.002 inch thick sheet of aluminum foil is placed thereon. The aluminum foil is cut slightly oversized so as to overhang the wooden block. A second wooden block is placed on top of the aluminum foil and the entire assembly is placed under light pressure in a spring-loaded clamp. Brass terminals are connected to the aluminum foil and the current from a 110 volt line is passed through the foil. The heat from the current flowing through the aluminum foil melts both the polyethylene and the aluminum foil, thereby breaking the electrical circuit. The wooden blocks are welded together with a strong bond.

This invention provides a unique method for supplying heat to a thermoplastic material to melt same and steal the thermoplastic material to a solid surface. In particular, this method is highly efficient, since the heat is supplied only at the locus of the seal. Not only does this method provide low power consumption, but it eliminates unnecessary heating of the main body of the thermoplastic resin and prevents the concomitant thermal decomposition frequently associated therewith.

In its broadest aspects, the present method may be employed to seal any thermoplastic resin to any solid surface that is adhesively receptive to the softened thermoplastic resin. A typical field of application is the sealing together of a plurality of sheets or blocks of the same or different thermoplastic resin. This method is particularly suited for sealing together thick sections of thermoplastic resins which heretofore could not be heat sealed together by known technique. Another important application of the present method resides in sealing wooden surfaces together in manufacturing plywood or in laminating veneer coats to a wooden base, cf. Example III.

The metallic conductor employed in the process may be used in many varied physical forms, provided only that the conductor be relatively thin, preferably less than 0.1 inch thick and more especially less than 0.01 inch thick. Open mesh wire screen is an especially preferred embodiment of the invention in that the softened resin may easily flow around the thin wire heating elements to contact the adjacent surface. Thin metal foils may be used advantageously provided that sufficient heat is generated in the foil to melt it so that the softened thermoplastic resin may contact the adjacent surface. The conductor can be formed by "printing" the metallic conductor on the thermoplastic resin (as is done in the printed electrical circuit art) or by coating the thermoplastic resin with a protective coating composition containing a finely divided metal pigment.

The thermoplastic materials that may be employed in the practice of this invention include cellulose ethers, e.g., methyl cellulose, ethyl cellulose; cellulose esters, e.g., cellulose acetate, cellulose butyrate; homopolymers and interpolymers derived from vinylidene monomers containing the grouping $CH_2=C<$ such as olefins, e.g., ethylene, isobutylene; vinyl halides, e.g., vinyl chloride, vinyl bromide; vinylidene chloride; vinyl ethers, e.g., vinyl methyl ether; vinyl aromatic compounds, e.g., styrene, vinyl toluene, alpha-methylstyrene, nuclear halogenated styrene, nuclear alkylated styrene; vinyl carboxyl monomers and derivatives thereof, e.g., acrylic acid, acrylic acid esters, acrylamide, acrylonitrile, methacrylic acid and its corresponding derivatives; vinyl esters, e.g., vinyl acetate, vinyl benzoate; and interpolymers of vinylidene monomers with alpha, beta-unsaturated polycarboxylic acids and derivatives thereof, e.g., maleic anhydride, maleate esters, fumaric acid esters, etc.

Although the method of this invention may be employed generally for sealing any type of thermoplastic material to a solid surface, it is particularly adapted for sealing sections of foamed thermoplastic resins to themselves or to other surfaces. The heat sealing of foamed thermoplastic resins presents special problems since heating such foams to the softening point of the resin causes collapse of the foam. This problem has been so severe that foamed thermoplastic resins heretofore have not been sealed to themselves or to other surfaces by thermal methods. By the method of the present invention, however, wherein the heat is applied only at the locus of the seal, foamed thermoplastic resins can be sealed to themselves or other surfaces without causing collapse of the foam.

The above descriptions and particularly the examples are set forth by way of illustration only. Many other variations and modifications thereof will be apparent to those skilled in the art and can be made without departing from the spirit and scope of the invention herein described.

What is claimed is:

1. The method for joining a foamed thermoplastic resin to a solid surface that is adhesively receptive to the thermoplastic resin when it is in a melted condition which comprises interposing a thin imperforate metal foil between the foamed thermoplastic resin and the solid surface to be joined, placing the assembly of the foamed thermoplastic resin, the solid surface and the metal foil under pressure, electrically connecting the metal foil into an electric circuit and passing sufficient current through the metal foil to melt the foil thereby melting a contiguous layer of the foamed thermoplastic resin, breaking the electric circuit and causing the melted metal to coalesce into small discontinuous droplets; said imperforate metal foil being less than 0.01" thick.

2. The method for joining two sections of foamed thermoplastic resin together which comprises interposing a thin imperforate metal foil between the sections of foamed thermoplastic resin, placing the assembly of the sections of foamed thermoplastic resin and the metal foil under pressure, electrically connecting the metal foil into an electric circuit and passing sufficient current through the metal foil to melt the foil thereby melting the contiguous layers of the foamed thermoplastic resin, breaking the electric circuit and causing the melted metal to coalesce into small discontinuous droplets; said imperforate metal foil being less than 0.01" thick.

3. The method of claim 1 in which the foamed thermoplastic resin is a foamed styrene polymer.

4. The method of claim 1 in which the sections of the foamed thermoplastic resin are sections of a foamed styrene polymer.

References Cited in the file of this patent

UNITED STATES PATENTS

| | | |
|---|---|---|
| 2,241,312 | Luty | May 6, 1941 |
| 2,372,929 | Blessing | Apr. 3, 1945 |
| 2,376,653 | Boyer | May 22, 1945 |
| 2,393,100 | Gallay et al. | Jan. 15, 1946 |
| 2,434,573 | Mann et al. | Jan. 13, 1948 |
| 2,467,133 | Irons | Apr. 12, 1949 |
| 2,642,911 | De Shazor | June 23, 1953 |
| 2,713,017 | Burns | July 12, 1955 |
| 2,740,743 | Pace | Apr. 3, 1956 |
| 2,800,162 | Rohdin | July 23, 1957 |
| 2,859,153 | Zucht | Nov. 4, 1958 |

FOREIGN PATENTS

| | | |
|---|---|---|
| 599,617 | Great Britain | Mar. 17, 1948 |
| 652,054 | Great Britain | Apr. 18, 1951 |